United States Patent [19]

Weintraub et al.

[11] 4,194,972

[45] Mar. 25, 1980

[54] METHOD FOR BREAKING AN OIL-IN-WATER EMULSION

[75] Inventors: Marvin H. Weintraub, Oak Park; Matthew A. Dzieciuch, Dearborn Heights; Roy L. Gealer, Southfield, all of Mich.

[73] Assignee: Ford Motor Company, Dearborn, Mich.

[21] Appl. No.: 821,009

[22] Filed: Aug. 1, 1977

Related U.S. Application Data

[63] Continuation-in-part of Ser. No. 754,790, Dec. 27, 1976, abandoned.

[51] Int. Cl.² ............................ C02B 1/20; C02C 5/04
[52] U.S. Cl. ...................................... 210/43; 204/149; 210/44; 210/47; 210/50
[58] Field of Search .................... 204/149–152; 210/42 R, 43, 44, 45, 47, 50–53, 59, 60, 63 R

[56] References Cited

U.S. PATENT DOCUMENTS

| | | | |
|---|---|---|---|
| 3,347,786 | 10/1967 | Baer | 210/47 |
| 3,523,891 | 8/1970 | Mehl | 210/47 |
| 3,783,114 | 1/1974 | Ishii et al. | 204/149 |
| 3,788,967 | 1/1974 | Kawahata et al. | 204/149 |
| 3,809,631 | 5/1974 | Ohta | 204/149 |
| 3,816,276 | 6/1974 | Ichiki et al. | 210/44 |
| 3,826,725 | 7/1974 | Schick | 204/149 |
| 3,925,203 | 12/1975 | Turner | 210/63 R |
| 3,933,606 | 1/1976 | Harms | 210/44 |
| 3,969,245 | 7/1976 | Ramirez | 210/44 |
| 3,986,953 | 10/1976 | Beaucaire | 210/43 |
| 4,081,338 | 3/1978 | Golovoy | 210/44 |

FOREIGN PATENT DOCUMENTS 1069803 11/1959 Fed. Rep. of Germany ............ 210/47

Primary Examiner—Charles N. Hart
Assistant Examiner—Peter A. Hruskoci
Attorney, Agent, or Firm—William E. Johnson; Keith L. Zerschling

[57] ABSTRACT

A method is disclosed for breaking an oil-in-water emulsion. Briefly, the method of this invention includes the following general steps. A porous ferrous ion producing anode is established. A supply of the oil-in-water emulsion is located on one side of the anode and a fixed volume of the emulsion is flowed through a fixed cross sectional area of the anode per unit of time. Less than a passivating current is flowed through each unit area of the anode per unit of time thereby dissolving into the emulsion ferrous ion in sufficient quantity to break the emulsion. The flowing of the fixed volume of the emulsion through the electrode per unit of time and the dissolving of sufficient quantity of ferrous ions results in a homogeneous dispersion of the ferrous ions in the fixed volume of the emulsion. There is an in situ generation of hydroxyl ion at the cathode and tiny air bubbles are introduced near the electrodes to oxidize the ferrous ions to ferric ions. The ferric ions are then permitted time to break the emulsion and remove the oil therefrom. This oil floats to the top surface in a froth and is removed.

3 Claims, 4 Drawing Figures

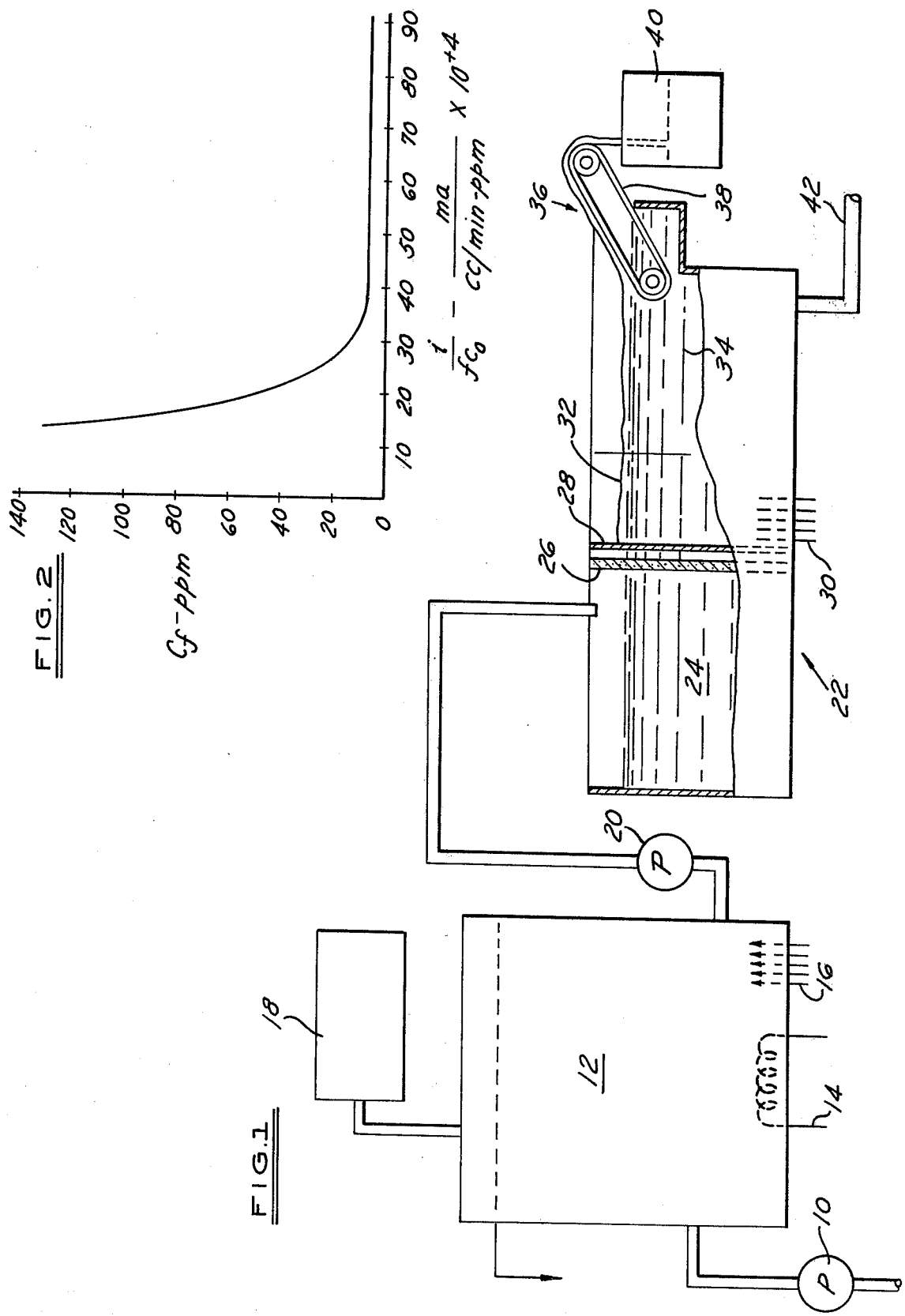

METHOD FOR BREAKING AN OIL-IN-WATER EMULSION

This application is a Continuation-In-Part of our prior application, Ser. No. 754,790, filed Dec. 27, 1976, for a Method for Breaking an Oil-In-Water Emulsion, now abandoned.

BACKGROUND OF THE INVENTION

U.S. Pat. No. 3,523,891 for "Electrolytic Sewage Treatment System and Process" discloses an apparatus in which a batch treatment process can be carried out in which a dissolvable iron electrode is employed to treat sewage waste. The system includes spaced metal electrode plates connected to a power supply for producing multivalent metallic ions and hydroxyl ions during treatment of waste waters. The metallic and hydroxyl ions form a flock which floats to the surface of the cell and entraps its suspended solids forming a supernatant, frothy sludge.

We have recently been working in the field of electrolytic treatment of waste water containing stabilized oil emulsion in an effort to decrease the cost and increase the production results of such a treatment system. We have, in particular, been working on a system which is operable on a continuous basis. We also have been investigating various operational facets of these systems in order to develop a process for treating such oily waste waters which is the most efficient from the standpoint of power consumption per rate of removal of oily materials from waste waters.

It is an object of our invention to provide a method of breaking an oil-in-water emulsion which is simple and efficient in operation, and economical to carry out.

SUMMARY OF THE INVENTION

This invention relates to a method of breaking an oil-in-water emulsion, and more particularly, to a method of breaking an oil-in-water emulsion which is simple and efficient in operation.

Briefly, we have developed a process for breaking an oil-in-water emulsion which may be applied on a continuous basis. We are able to use a porous iron electrode in the method as the medium by which ferrous ions are placed uniformly in the emulsion to break the same. Our concept is based on the principle of putting the required ferrous ion concentration necessary to break the emulsion into the emulsion as rapidly and as uniformly as possible. We obtain this by flowing a fixed amount of emulsion through a unit area of a porous ferrous ion producing anode. A predetermined amount of power is supplied per unit area of the anode. Thus, as a fixed volume of the emulsion flows through a unit area of anode, it receives the required amount of ferrous ion necessary to break the emulsion almost in an instantaneous fashion.

Simultaneously, with the dissolving of the anode there is the in situ generation of the hydroxyl ion at the cathode where concentration is fixed by the electrochemical reaction. Air is introduced near the electrodes as air is important for effective reaction to occur, that is, the oxidation of ferrous ion to ferric ion which is necessary to break the emulsion.

In accordance with the broad teachings of the method of our invention, an oil-in-water emulsion is broken in the following manner. A porous ferrous ion producing anode is established and a supply of the emulsion is located on one side thereof. A fixed volume of the emulsion is flowed through the porous anode per unit of time. Less than a passivating current is flowed through each unit area of the anode per unit of time. This current dissolves into the fixed volume of the emulsion passing through the electrode ferrous ion in sufficient quantity to break the fixed volume of the emulsion. The flowing of the emulsion through the porous iron electrode per unit of time and the dissolving of the ferrous ion results in a homogeneous dispersion of ferrous ion in the fixed volume of the emulsion. The air supplied near the electrodes oxidizes the ferrous ions to ferric ions, the latter being effective to break the emulsion.

In accordance with specific teachings of the method of this invention, the amount of electric current passed through the anode per unit area may be calculated by the formula $i=(N)f(Co)(10^{-4})$ wherein: N is any number in the range from 20 to 50; f is flow rate of the emulsion per unit area of electrode in cc/minute; Co is the initial concentration of oil in the water in parts per million; and i is equal to current per unit area of electrode in milliamperes.

BRIEF DESCRIPTION OF THE DRAWINGS

FIG. 1 is a drawing which depicts a schematic outline of the system in which the method of our invention can be practiced.

FIG. 2 is a graphical presentation showing the effect of using various amounts of current in the method of our invention.

FIG. 3 is a drawing which depicts our system using a cylindrical electrode.

FIG. 4 is a cross section view taken on line 4—4 of FIG. 3.

DESCRIPTION OF THE PREFERRED EMBODIMENT

Construction

The method of this invention may be applied to oil-in-water emulsions of any general type. In particular oil-in-water emulsions used in machining of metal articles as a coolant and lubricant therefor may be treated by this process in order to break the emulsion and remove the oil from the water. A typical oil-in-water emulsion for a typical cutting oil lubricant comprises, approximately, by weight of 79% mineral oil, 18% of soap emulsifier and 3% of a mixture of biocidal and stabilizing agents. This soluble oil cutting fluid is prepared by diluting the above-described emulsion with water in a weight ratio of at least about 50 to 1. This solution is directed over a metal article upon which a cutting tool is removing material. The cutting fluid cools the article being formed, flushes away the chips being generated in the cutting operation and also lubricates the surface being cut.

After a period of operative life, the cutting oil fluid becomes unsuitable for further use and must be discarded. Because of the emulsion, the material may not be directly discarded because it contains oil in the water. Therefore, before the material can be discarded, it is necessary to break the emulsion and thereby separate the oil from the water, permitting the clean water to be discarded and the oil to be recycled or discarded in a manner appropriate for hydrocarbon materials.

A more important use is for the clean-up of rinse waste waters from the rinsing of machined parts in which the water may contain a dilute concentration of emulsified oil generally ranging from 500 to 4000 ppm.

Our process is one which provides an economical and efficient method for breaking an oil-in-water emulsion. The method of our invention will be best understood by considering the contents of the following description while referring to the attached drawing, particularly FIG. 1 thereof.

Oily waste water from a plant, such as discarded waste water from rinsing of parts machined using oil emulsion coolant is delivered by means of a pump 10 to a storage tank 12. In this tank, heat and air are added by means of a heater 14 and an air delivery system 16 (schematically represented by a plurality of arrows). Any free oil which flows to the surface in the storage tank may be skimmed off and removed. Also, in the receiving and storage tank, the pH of the oily waste water may be adjusted to a pH in the range of 6 to 10 by means of a pH addition system 18. The amount of material added from the pH addition system to achieve the desired pH is calculated in normal pH calculating procedures. A small amount of salt also may have to be added to promote ionic conductivity and prevent passivation of the electrode. The addition of heat and air to the tank is simply to keep the system at set conditions for further treatment.

A second pump 20 continuously withdraws a portion of the oily waste water held in the storage tank 12 and delivers that oil-in-water emulsion to an electrolytic cell generally indicated by the numeral 22. This cell has a receiving zone 24 into which the emulsion is initially delivered. The cell also has a ferrous ion producing anode in the form of an iron chip anode 26 which can be formed from the metallic chips generated from any steel or iron machining operation. This iron chip anode is slowly dissolved to produce ferrous ions by the passage of electric current therethrough. The rate at which the anode is dissolved is a function of the amount of current passing therethrough. The higher the rate of current, the more iron is dissolved but, of course, the more power that is used. Fresh iron chip additions from time to time to this electrode chamber assures that the chamber contains sufficient iron electrode for continuously carrying out the process. When using the electrode we require that less than a passivating current be passed therethrough. By this we mean that a current density is not reached which would result in a discontinuation of iron dissolution and a consumption of power to decompose water instead.

The amount of power passing through the anode controls the amount of iron which is dissolved into the oil-in-water emulsion passing through the anode. If one visualizes the flow of the emulsion through the anode as a slug-type flow in which a unit volume of emulsion moves into the anode is held therein and is treated and then moved therethrough, then it will be easy to understand that on one side of the iron chip anode a slug of emulsion has no iron therein, that the iron is placed in the emulsion to a particular level as that slug of emulsion passes through the iron chip anode and that after passage through the anode the slug of emulsion will have a particular level of iron therein which will generally remain constant. Thus, the process of adding iron to the emulsion is one that occurs almost instantaneously in that the concentration of electrically dissolved ferrous ions in the emulsion goes from zero on one side of the iron chip anode to a certain fixed level on the other side of the iron anode, the fixed level being determined by the amount of power being used at the anode. The particular manner for controlling the amount of power used to achieve the best results will be discussed in greater detail hereinbelow.

After a slug of emulsion passes through the iron chip anode 26, it passes through a cathode screen 28 at which hydroxyl ions are generated to complete the electrochemical reaction as is known in the art. About this position, air is added by an air supply system 30. The air supplied is in the form of tiny bubbles in order to provide for oxidization of ferrous ions to ferric ions and to develop a mechanism by which the oil coming out of the emulsion may be picked up and floated to the surface. The oil waste, which is an oil-iron hydroxide sludge 32, begins to form on the surface of the emulsion in an emulsion breaking zone 34 of the electrolytic cell 22. This zone is sufficiently long to permit substantially full separation of the oily waste from the water.

Near the end of the oil emulsion breaking zone 34 of the electrolytic cell 22 is provided a sludge removing system generally identified by the numeral 36. This system includes a conveyor 38 which transports the sludge 32 upwardly from the water and deposits it in a sludge receiving device 40.

Clear water is withdrawn from the bottom of the emulsion breaking zone 34 by means of a pipe 42. The water from this pipe may be pumped to a sewage system or may be recycled depending upon the clarity thereof and the requirements for process water in the plant using this system.

Operation

In accordance with the teachings of this invention, the method of this invention is operated in the following manner. Power is applied at the anode 26 in accordance with the following equation. This equation is based on a unit area of the electrode and each unit area has the same power applied thereto.

The power applied is in accordance with the formula $i=(N)f(Co)$ $(10^{-4})$ wherein: N is any number in the range from 20 to 50, f is the flow rate of the emulsion per unit area of electrode in cc/minutes; Co is the initial concentration of oil in the water in parts per million; and i is equal to the current per unit area of electrode in milliamperes. This equation, in the form $N=i(10^{+4})/fCo$, is shown plotted in FIG. 2 versus the final concentration in parts per million of oil in the waste water. It should be noted from the graph that when N is in the range from 30 to 50, the parts per million of oil in the final product is very low. It is also important to note that the curve flattens out at about the 40 to 50 range and, thus, there is no need of exceeding this amount of current. In other words, greater amount of current representative by higher N values do not produce any significantly greater reduction of oil in the waters being treated. Thus, we teach that it is not desirable to operate at an N value greater than 50 because one simply is wasting power and achieving no added benefit therefrom.

In accordance with the preferred teachings of the method of this invention, the iron chip anode 26 is operated with the power per unit area being determined in accordance with the formula discussed above in which N is in the range from 20 to 50. Operation of this cell at such a power load has allowed us to process 0.2 gallons per minute of a solution containing 2000 parts per million of oil per square foot of electrode. Generally, the water delivered through the pipe has a final concentration of oil contained therein of about 10 parts per million.

Cylindrical Electrode

In FIGS. 3 and 4, there is shown an electrolytic cell 122 having a cylindrical electrode construction which is operated in the manner described above in order to break an oil-in-water emulsion. In this case, the second pump (not shown) continuously withdraws a portion of the oily waste water held in the storage tank (not shown) and delivers that oil-in-water emulsion to the electrolytic cell. This cell is of generally cylindrical configuration and it has a receiving zone 124 into which the emulsion is delivered by means of a pipe 125 which, in turn, is connected to the previously mentioned second pump. The cell also has a ferrous ion producing anode in the form of an iron chip anode 126 which can be formed from the metallic chips generated from any steel or iron machining operation. This iron chip anode acts as previously described.

After emulsion passes through the chip anode 126, it passes through a cathode screen 128 at which the hydroxyl ions are generated as previously described. About this position, air is added by an air supply system 130. The air is supplied in the form of tiny bubbles in order to provide for the oxidation of ferrous ions to ferric ions as previously described. The oil waste, which is an oil-iron hydroxide sludge 132 forms on the top surface of the emulsion in an emulsion breaking zone 134. The sludge 132 overflows into a sludge overflow zone 136 for removal from the system.

Clear water is withdrawn from the bottom of the emulsion breaking zone 134 by means of a pipe 142. The water may be recycled or sent to a sewer as previously described.

A cylindrical-type electrode system may be used in applications where an elongated tank takes up too much room. A cylindrical system may also be used in those cases where a treatment facility has cylindrical storage tanks available which are being used for storage of waste materials. One could then turn the system from a storage system into a treatment system by simply adding the electrode construction and a zone for removing sludge from the top of the tank.

Having described our method herein, it is apparent that those skilled in the art will find ways of modifying the method which still falls within the true spirit and scope of this invention. It is intended that all such modifications be included within the scope of the appended claims.

What we claim is:

1. A method of breaking an oil-in-water emulsion which comprises:
   establishing a porous ferrous ion producing electrode;
   locating a supply of oil-in-water emulsion on one side of said porous ferrous ion producing electrode, said supply of the oil-in-water emulsion being substantially free of ferrous ions;
   flowing a fixed volume of said supply of the oil-in-water emulsion through said porous ferrous ion producing electrode per unit of time;
   flowing less than a passivating current per unit area of electrode through said porous ferrous ion producing electrode per unit of time, thereby to dissolve into said fixed volume of the oil-in-water emulsion ferrous ions in sufficient quantity to break the oil-in-water emulsion whereby said fixed volume of the oil-in-water emulsion is substantially free of ferrous ions on one side of said electrode, but has a uniformly dispersed amount of ferrous ions therein on the other side of said electrode;
   oxidizing said uniformly dispersed ferrous ions in said fixed volume of the oil-in-water emulsion to ferric ions, the latter ions being effective in breaking the emulsion; and
   permitting said ferric ions to break the oil-in-water emulsion.

2. A method of breaking an oil-in-water emulsion which comprises:
   establishing a porous ferrous ion producing electrode;
   locating a supply of the oil-in-water emulsion on one side of said porous ferrous ion producing electrode, said supply of oil-in-water emulsion being substantially free of ferrous ions;
   flowing a fixed volume of said supply of oil-in-water emulsion through said ferrous ion producing electrode per unit of time;
   flowing electric current through a unit of area of said electrode in accordance with the following equation $i = (N)f(Co) 10^{-4}$ wherein:
   N is a number in the range from 20 to 50.
   f is the flow rate of oil-in-water emulsion per unit area of electrode in cc/minute,
   Co is the initial concentration of oil-in-water in parts per million, and
   i is the current per unit of electrode in milliamps thereby to dissolve into said fixed volume of the oil-in-water emulsion ferrous ions in sufficient quantity to break the oil-in-water emulsion whereby said fixed volume of the oil-in-water emulsion is substantially free of ferrous ions on one side of said electrode, but has a uniformly dispersed amount of ferrous ions therein on the other side of said electrode;
   oxidizing said uniformly dispersed ferrous ions to ferric ions, the latter ions being effective to break the emulsion; and
   permitting said ferric ions to break the oil-in-water emulsion.

3. The method of claim 2, wherein: said porous ferrous ion producing electrode is of cylindrical construction.

* * * * *